United States Patent [19]

Mabuchi

[11] Patent Number: 5,504,865

[45] Date of Patent: Apr. 2, 1996

[54] DATA TRANSFER SYSTEM FOR EFFECTING BIDIRECTIONAL DATA TRANSFER AMONG A PLURALITY OF MICROPROCESSORS

[75] Inventor: Toshiaki Mabuchi, Tokyo, Japan

[73] Assignee: Canon Kabushiki Kaisha, Tokyo, Japan

[21] Appl. No.: 325,533

[22] Filed: Oct. 14, 1994

Related U.S. Application Data

[63] Continuation of Ser. No. 41,531, Apr. 2, 1993, abandoned, which is a continuation of Ser. No. 316,578, Feb. 28, 1989, abandoned, which is a continuation of Ser. No. 910,403, Sep. 22, 1986, abandoned.

[30] Foreign Application Priority Data

Sep. 20, 1985 [JP] Japan ................................. 60-206333

[51] Int. Cl.$^6$ ................................................. G06F 15/16
[52] U.S. Cl. ............................. 395/200.14; 395/200.17
[58] Field of Search ....................... 395/200.13, 200.14, 395/325, 725, 200.15, 200.16

[56] References Cited

U.S. PATENT DOCUMENTS

| | | | |
|---|---|---|---|
| 3,696,338 | 10/1972 | Preiss | 395/200 |
| 3,988,716 | 10/1976 | Fletcher et al. | 395/550 |
| 4,212,080 | 7/1980 | Milliken | 364/900 |
| 4,298,928 | 11/1981 | Etoh et al. | 364/200 |
| 4,511,968 | 4/1985 | Fencsik et al. | 395/200 |
| 4,547,849 | 10/1985 | Louie et al. | 364/200 |
| 4,556,958 | 12/1985 | Ugon | 364/200 |
| 4,608,630 | 8/1986 | Schott | 364/200 |
| 4,663,730 | 5/1987 | Ikeda | 364/900 |
| 4,698,746 | 10/1987 | Goldstein | 395/200 |

FOREIGN PATENT DOCUMENTS 0051332 12/1982 European Pat. Off. .......... G06F 3/04

OTHER PUBLICATIONS

Osborne, Adam, An Introduction to Microcomputers, vol. 1, 1980, pp. 4–33 through 4–35.

Primary Examiner—Kevin A. Kriess
Attorney, Agent, or Firm—Robin, Blecker, Daley and Driscoll

[57] ABSTRACT

A data transfer system includes first and second microprocessors, each having a data input portion, a data output portion, and a data transfer control signal input/output portion to input or output a data transfer request signal for requesting permission for transfer of data or a data transfer permission signal representing the permission for transfer of data. A first data transfer path connects the data output portion of the first microprocessor with the data input portion of the second microprocessor. A second data transfer path connects the data output portion of the second microprocessor with the data input portion of the first microprocessor. A data transfer control signal transmitting path connects the data transfer control signal input/output portion of the first microprocessor with the data transfer control signal input/output portion of the second microprocessor to feed the data transfer request signal or the data transfer permission signal between the microprocessors.

10 Claims, 5 Drawing Sheets

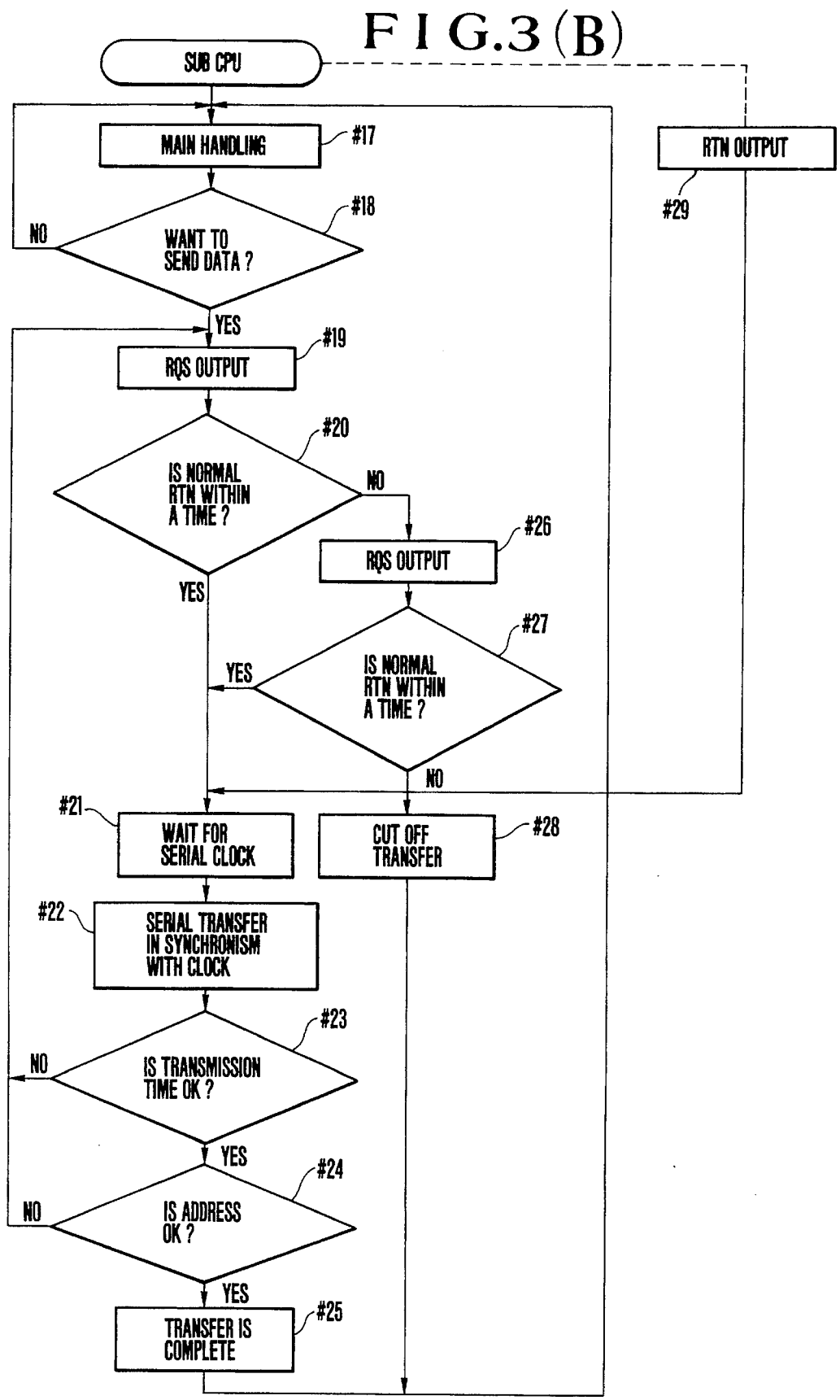

DATA TRANSFER SYSTEM FOR EFFECTING BIDIRECTIONAL DATA TRANSFER AMONG A PLURALITY OF MICROPROCESSORS

This is a continuation application under 37 CFR 1.62 of prior application Ser. No. 08/041,531, filed Apr. 2, 1993, now abandoned, which is a continuation of Ser. No. 07/316,578, filed Feb. 28, 1989, abandoned, which is a continuation of Ser. No. 06/910,403, filed Sep. 22, 1986, abandoned.

BACKGROUND OF THE INVENTION

This invention relates to a data transfer system for effecting bidirectional data transfer among a plurality of central processing units (CPUs).

DESCRIPTION OF THE RELATED ART

Publicly known data transfer methods include a parallel method and a serial method.

In the parallel method, the number of independent connection lines is equal to the number of data bits in a data word. As the desired data word bit size increases, the number of connection lines increases accordingly. Bidirectional data transfer between CPUs by independent such sets of connection lines gives rise to disadvantages, e.g., system complexity, size increase and high production cost.

In the serial method, one CPU is designated as the main CPU and provides a system clock signal. Other participating CPUs are secondary or sub-CPUs and are furnished with the system clock signal to operate with respect thereto in timing functions. A composite connection cable is used by all participating CPUs and the clock signal always flows through the connection cable. Disadvantages of this method involve the heightened probability of production of radiant noise, rigidity of preselected system code and problems associated with input and output of data.

SUMMARY OF THE INVENTION

An object of the invention is the elimination of the foregoing disadvantages.

Another object of the invention is to provide a data transfer system which does not require increase in the number of connection lines for data transfer with increase in data word size and which does not limit system code variation.

In attaining such objects, the invention provides in one embodiment thereof a data transfer system which includes first and second microprocessors, each having a data input portion, a data output portion, and a data transfer control signal input/output portion to input or output a data transfer request signal for requesting permission for transfer of data or a data transfer permission signal representing the permission for transfer of data. A first data transfer path connects the data output portion of the first microprocessor with the data input portion of the second microprocessor. A second data transfer path connects the data output portion of the second microprocessor with the data input portion of the first microprocessor. A data transfer control signal transmitting path connects the data transfer control signal input/output portion of the first microprocessor with the data transfer control signal input/output portion of the second microprocessor to feed the data transfer request signal or the data transfer permission signal between the microprocessors. Data transmission is bidirectional in accordance with the invention, as below detailed.

Another object of the invention is to provide a data transfer system which lessens errors due to noise and loss of data.

This object is attained by another embodiment of the invention, wherein a data transfer system is provided in which, before data is transmitted from a first microprocessor to a second microprocessor, the first microprocessor produces a data transfer request signal, thus requesting permission for the transmission of data. Where the input of data is then possible or permissible at the second microprocessor, the second microprocessor, within a prescribed time from the moment at which the data transfer request signal from the first microprocessor was received thereby, produces a data transfer permission signal indicating that it is permissible to transmit data. A common line is used for bidirectional transmission of the transfer request and transfer permission signals.

A further object of the invention is to provide a data transfer system which enables smooth exchange of data among a plurality of microprocessors.

In attaining this object, the invention provides a further embodiment of a data transfer system among, for example, three microprocessors. Herein, the first microprocessor receives and produces data and the second microprocessor produces a data transfer request signal for requesting transfer of data before the data is produced and the third microprocessor is responsive to the data transfer request signal from the second microprocessor, while receiving and transmitting data with the first microprocessor, for producing a data transfer permission signal for permitting the transfer of the data to the second microprocessor within a prescribed time from the moment at which the data transfer request from the second microprocessor was received and for holding the data produced from the second microprocessor. A common line is used for bidirectional transmission of the data transfer request signal and the data transfer permission signal between the second and third microprocessors.

Other objects and features of the invention will become apparent from the following detailed description of embodiments thereof by reference to the drawings.

DETAILED DESCRIPTION OF THE PREFERRED EMBODIMENTS

Figure 1:
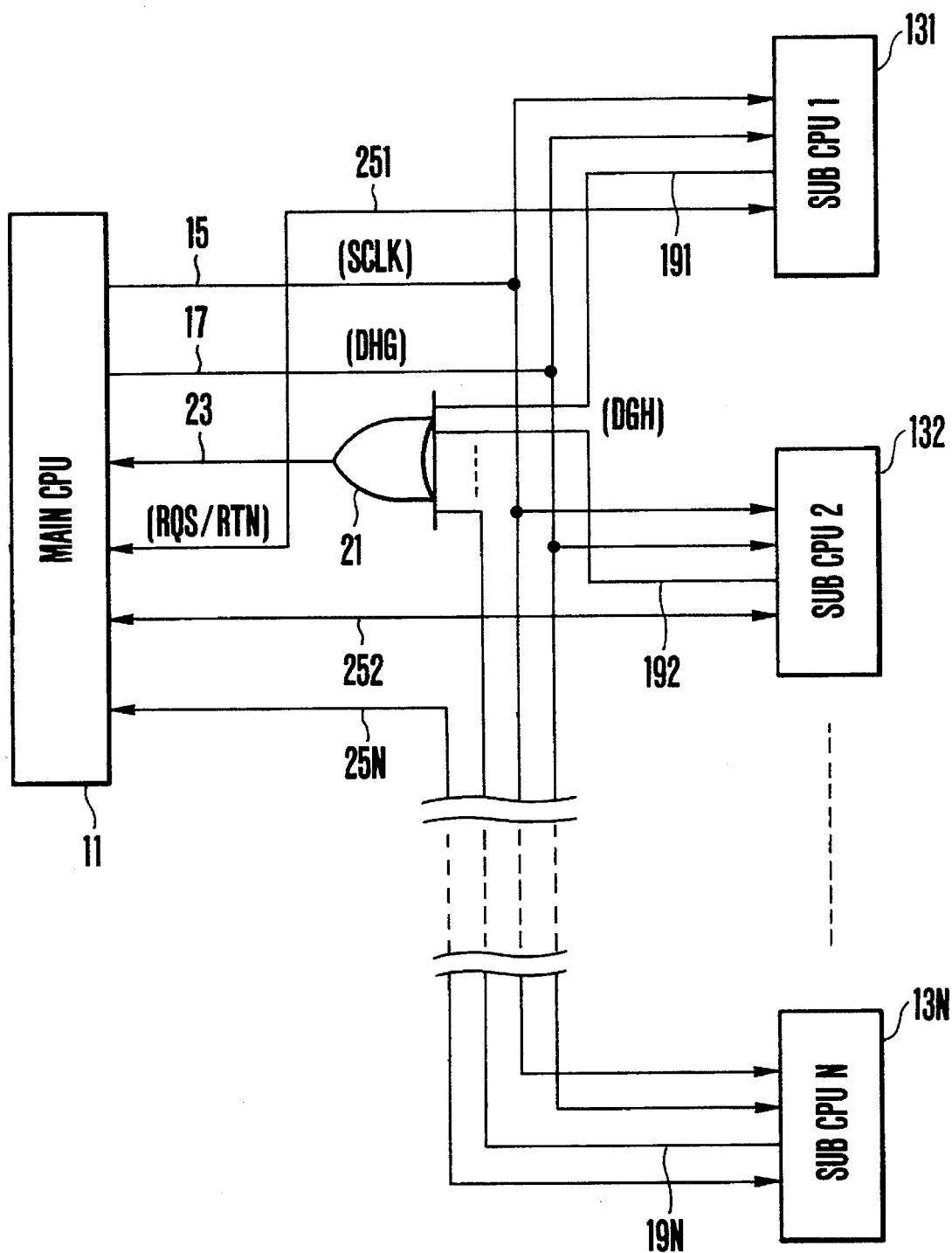
FIG. 1 is a block diagram illustrating the construction and arrangement of the elements of an embodiment of the data transfer system according to the present invention.

FIG. 1 illustrates one embodiment of the invention wherein a first or main CPU is designated at 11 and constitutes the center of the data transfer system. The system further includes: sub-CPUs 131, 132, ... 13N; serial clock line 15 extending from the main CPU to all sub-CPUs to furnish the system clock signal (SCLK) as the reference for serial data transfer; main-sub data line 17 through which the data (DHG) of the main CPU is transferred to the sub-CPUs; sub-main lines 191 through 19N through which the data (DGH) from the respective sub-CPUs 131 through 13N is transferred to the main CPU; OR gate 21, which has inputs from lines 191 through 19N and provides a single output on line 23 (sub-main serial data line); and bidirectional acknowledgement lines 251 through 25N, for transfer of acknowledgement signals (RQS/RTN) between the main CPU and the sub-CPUs. At times any one of the sub-CPUs may be disconnected from the main CPU to operate independently thereof. System operation is now discussed with all sub-CPUs connected to the main CPU.

Figure 2A:
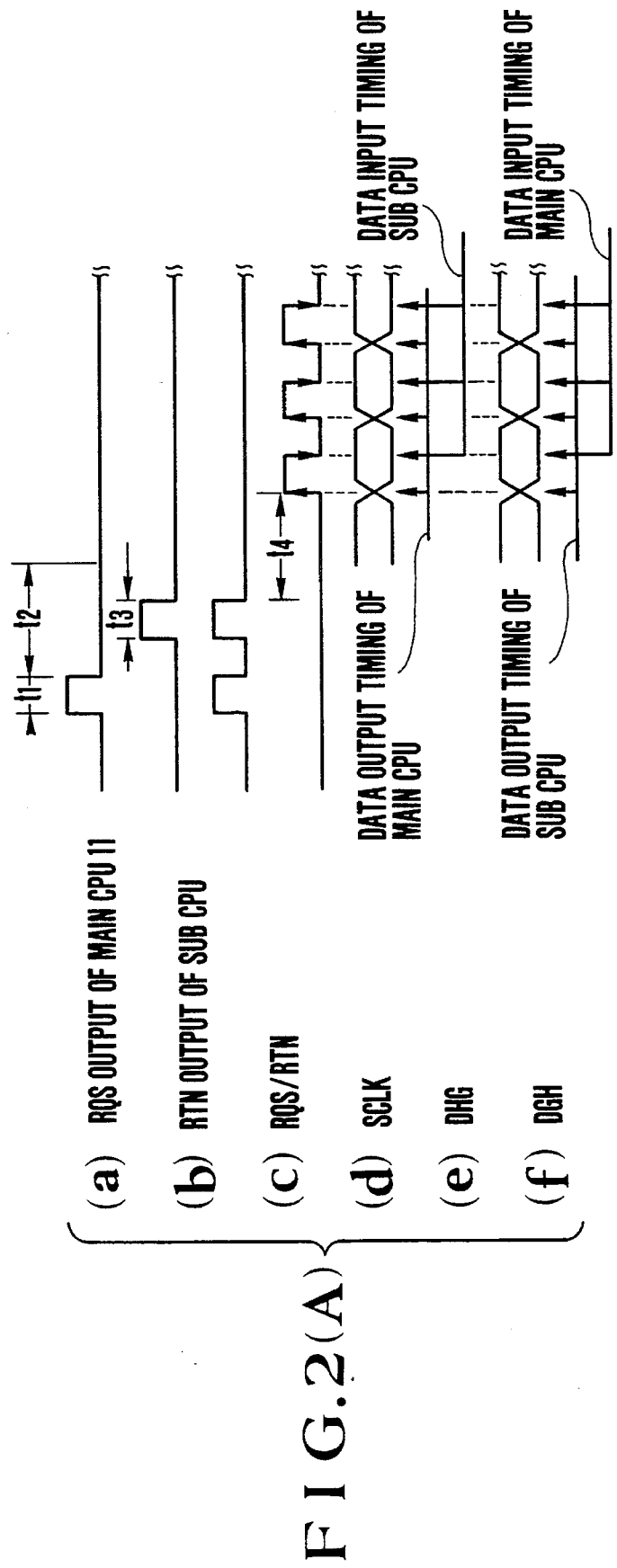
FIGS. 2(A) and 3(A) are pulse timing charts illustrating manners of operation of bidirectional data transfer among participating CPUs.
Figure 3:
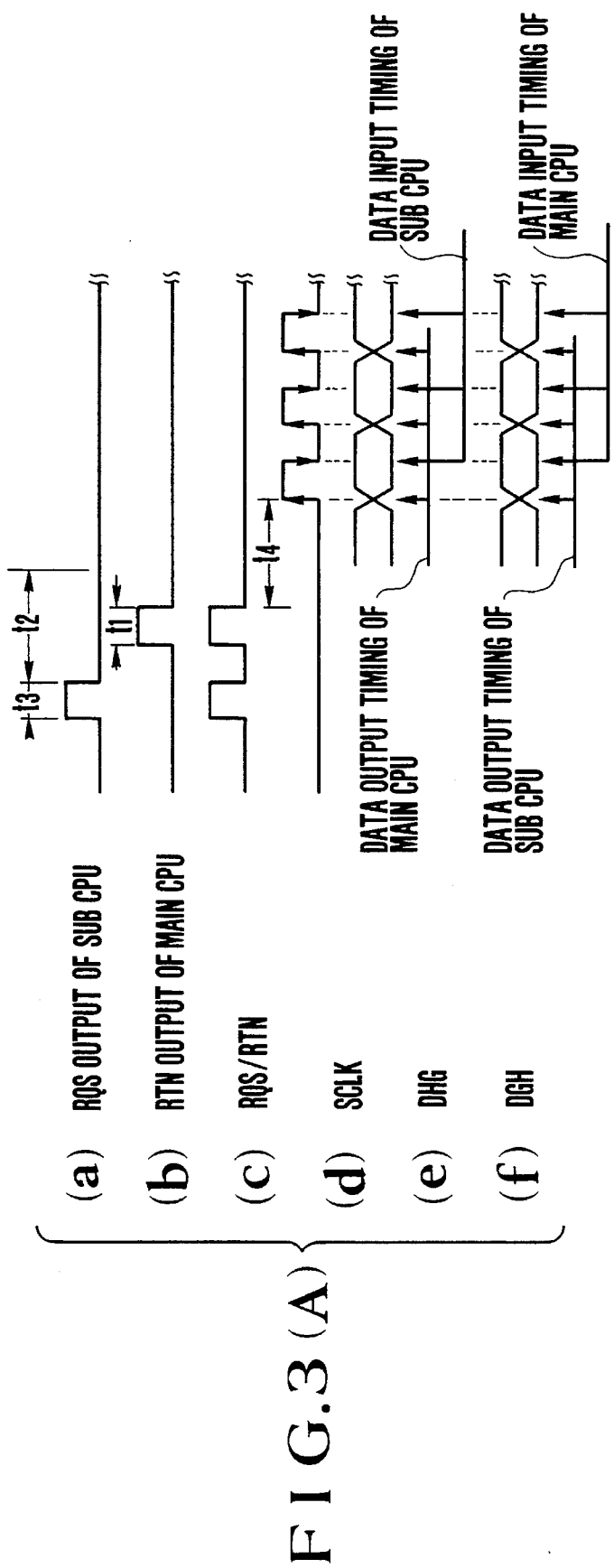

FIG. 2(A) shows the timing of the transfer of data from the main CPU to one of the sub-CPUs and FIG. 3(A) shows the operational flow chart. Assume that, during the main handling (step #1) in the main CPU, the present information from the main CPU is sent (step #2) to a particular sub-CPU (step #3), namely, sub-CPU 131, or that the main CPU receives information from such sub-CPU.

Figure 2B:
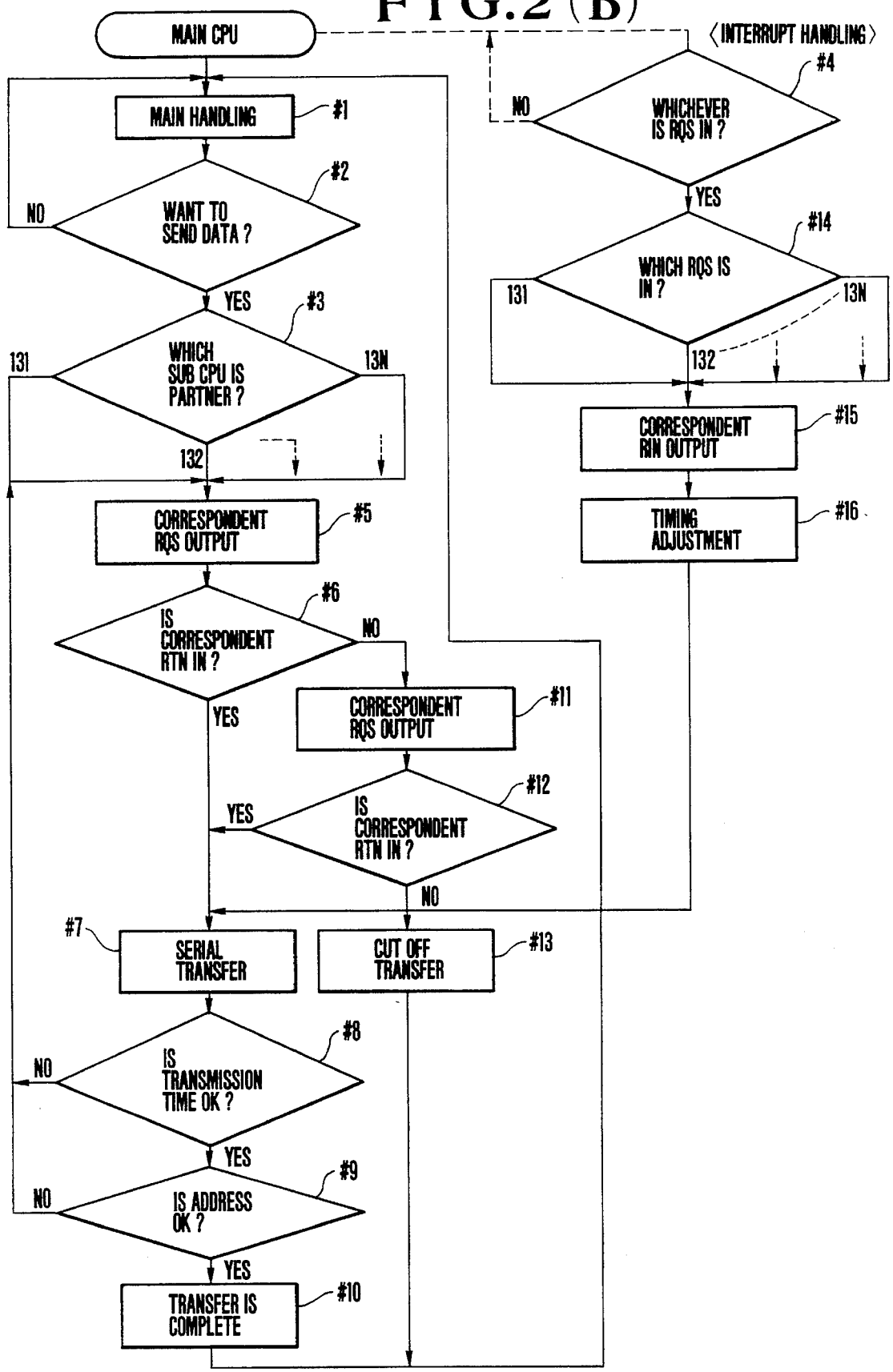
FIGS. 2(B) and 3(B) are flow charts of the operations of FIGS. 2(A) and 3(A) respectively.

In these events, the main CPU first places on line 251 an RQS output which has a high level for time t1 as is shown on line (a) of FIG. 2(A) and at step #5 in FIG. 2(B). Sub-CPU 131 constantly monitors line 251 and, if, when the RQS signal is received by this sub-CPU, it is in condition to transfer data, it places an RTN pulse on line 251 within time t2, such pulse taking a high level for time period t3.

The main CPU monitors line 251 to determine (step #6) whether there has been a RTN pulse, i.e., a pulse occurring in time t2 with high level occurring within time period t3. Upon such event, the main CPU then provides clock signals SCLK after time delay t4 and sets data for transfer. As the SCLK recycles, the main CPU furnishes output data DHG, as shown in (e) of FIG. 2(A), on the rising edge of SCLK and reads in the serial data from sub-main serial data line 23 on the falling edge of SCLK. Sub-CPU 131 operates simultaneously in manner providing output data (DGH) on line 191 on each rising edge of SCLK and reading in data (DHG) from main-sub data line 17 on each falling edge of SCLK. Transmission times and addresses are checked seriatim at step 7 and step 8 and if correct, transfer continues until complete (step #10). On the failure of either such check, the system returns to step #5.

In the type of system wherein the participating CPUs have respective connection line sets, separate from one another and connectable by a wire cable, where such wire cable is lengthy, line capacitance problems arise. Accordingly, the possibility of data drop-out or error in data transfer due to noise is heightened. This problem and other difficulties, such as may arise from plural sub-CPUs being on-line concurrently, are lessened by the practices above outlined, i.e., pulse monitoring as with t2 and t3 test periods, the assignment of individual addressed to sub-CPUs, and the inclusion of such addresses as bits in transfer code. Further, by using as the address code a code of the same inversion period as that of the SCLK, it is possible to prevent the SCLK from being mixed with noise or lost since a synchronizing signal component may be derived from such address code.

The above example of system operation of course applies with respect to all participating sub-CPUs. Discussion proceeds as to system operation on the occurrence of an RTN by a second sub-CPU in the course of a transfer operation between the main CPU and a first sub-CPU.

Assume that an RSQ is produced (step #5) and that no RTN affirmation is given in step #6. Another RSQ is produced (step #11) and if no RTN affirmation is given in step #12, transfer is cut off (step #13). During the course of such transfer operation between the main CPU and such first sub-CPU, the main CPU monitors the RQS/RTN lines with all participating sub-CPUs (step .#4). If the RQS has occurred in the course of such transfer operation, recognition is made in step #14 as to which sub-CPU generated the RQS. In step #15, following corresponding RTN generation, the address information of such sub-CPU is stored. When the transfer in progress has been completed, this CPU is permitted to produce its RQS and initiate data transfer at that later time (step #16). The use of this method, although suspect to such time delay in transfer, makes its possible to transfer data over the entire system.

FIG. 3(A) is a timing chart for another discussion and the operational flow chart is seen in FIG. 3(B). It will be assumed that sub-CPU 132, in the course of main handling therein (step #17), desires to send information to the main CPU (step #18) or to require information from the main CPU.

Sub-CPU 132 places an RQS on line 252 which takes a high level for time t3 (step #19). If, on receipt of such RQS, the main CPU is ready for transfer of data, the main CPU produces, within time t2 an RTN with high level for time t1 on line 252. The main CPU provides SCLK after delay t4.

Sub-CPU 132 tests such RTN on line 252 for t2 and t1 correspondence (step #20) and, if the RTN is found satisfactory, awaits the receipt of SCLK (step #21). The main CPU outputs its data DHG on main-sub data line 17 on each rising edge of the SCLK and reads in data from the sub-main serial data line 23 on each falling edge of SCLK. Concurrently, sub-CPU 132 outputs data DGH on sub-main data line 192 on each rising edge of SCLK and readis in data DHG from main-sub data line 17 on each falling edge of SCLK. (Step #22).

Transmission time and address are checked in step #23 and step #24. If satisfactory, the transfer runs to completion (step #25). A routine is provided in step #26, step #27 and step #28 for repeat sending of RQS, testing for RTN and cutting off transfer when the test is not met. Interrupt operation is effected in step #29 to process interrupt RQS generated by the main CPU.

As will be seen from the foregoing, the invention provides a bidirectional data transfer system which does not require any increase in the number of connection lines for data transfer among a plurality of CPUs with lessening adverse effect from noise.

What is claimed is:

1. A data transfer system for transferring data between a plurality of microprocessors, comprising:

(A) a first microprocessor for outputting control data to control other microprocessors, said first microprocessor having a transmission path for the exclusive use of transmission of a transmission request signal for requesting permission for transmission of the control data to said other microprocessors, or of reception of a reception permission signal for permitting reception of the control data transmitted from said first microprocessor, which reception permission signal is transmitted from said other microprocessors, wherein said first microprocessor outputs the control data to said other microprocessors after outputting said transmission request signal through said dedicated transmission path to said other microprocessors;

(B) a second microprocessor operative in accordance with the control data outputted from said first microprocessor, said second microprocessor being arranged to transmit said reception permission signal through said dedicated transmission path to said first microprocessor, if it is acceptable to receive the control data from said first microprocessor, within a predetermined period of time since reception of said transmission request signal transmitted from said first microprocessor through said dedicated transmission path; and (C) a third microprocessor operative in accordance with the control data outputted from said first microprocessor, said third microprocessor being arranged to transmit said reception permission signal through said dedicated transmission path to said first microprocessor, if it is acceptable to receive the control data from said first microprocessor, within a predetermined period of time since reception of said transmission request signal transmitted from said first microprocessor through said dedicated transmission path, said third microprocessor being different from said second microprocessor.

2. A system according to claim 1, wherein said control data is serially transmitted from said first microprocessor to said second or third microprocessor.

3. A system according to claim 1, wherein said control data outputted from said first microprocessor includes microprocessor control data for controlling said second or third microprocessor, and code data indicating as to which one of said second or third microprocessor is controlled by said microprocessor control data.

4. A system according to claim 2, wherein said first microprocessor is arranged to output code data indicative of the microprocessor from which said reception permission signal is outputted, said microprocessor control data, and a synchronizing signal synchronized with said microprocessor control data, after a predetermined period of time since said reception permission signal is outputted from said second or third microprocessor.

5. A system according to claim 4, wherein said code data has an inversion period which is the same as that of said synchronizing signal.

6. A data transfer system for transferring data between a plurality of microprocessors, comprising:

(A) a first microprocessor for outputting control data to control other microprocessors, said first microprocessor having a transmission path for the exclusive use of transmission of a transmission request signal for requesting permission for transmission of the control data to said other microprocessors, or of reception of a reception permission signal for permitting reception of the control data transmitted from said first microprocessor, which reception permission signal is transmitted from said other microprocessors, wherein when said first microprocessor does not receive said reception permission signal from said other microprocessors within a predetermined period of time since outputting of said transmission request signal through said dedicated transmission path to said other microprocessors, said first microprocessor outputs again said transmission request signal;

(B) a second microprocessor operative in accordance with the control data outputted from said first microprocessor, said second microprocessor being arranged to transmit said reception permission signal through said dedicated transmission path to said first microprocessor, and then receive the control data transmitted from said first microprocessor, if it is acceptable to receive the control data from said first microprocessor, within a predetermined period of time since reception of said transmission request signal transmitted from said first microprocessor through said dedicated transmission path; and (C) a third microprocessor operative in accordance with the control data outputted from said first microprocessor, said third microprocessor being arranged to transmit said reception permission signal through said dedicated transmission path to said first microprocessor, and then receive the control data transmitted from said first microprocessor, if it is acceptable to receive the control data from said first microprocessor, within a predetermined period of time since reception of said transmission request signal transmitted from said first microprocessor through said dedicated transmission path, said third microprocessor being different from said second microprocessor.

7. A system according to claim 6, wherein said control data is serially transmitted from said first microprocessor to said second or third microprocessor.

8. A system according to claim 6, wherein said control data outputted from said first microprocessor includes microprocessor control data for controlling said second or third microprocessor, and code data indicating as to which one of said second or third microprocessor is controlled by said microprocessor control data.

9. A system according to claim 8, wherein said first microprocessor is arranged to output code data indicative of the microprocessor from which said reception permission signal is outputted, said microprocessor control data, and a synchronizing signal synchronized with said microprocessor control data, after a predetermined period of time since said reception permission signal is outputted from said second or third microprocessor.

10. A system according to claim 9, wherein said code data has an inversion period which is the same as that of said synchronizing signal.

* * * * *

UNITED STATES PATENT AND TRADEMARK OFFICE
CERTIFICATE OF CORRECTION

PATENT NO. : 5,504,865
DATED : April 2, 1996
INVENTOR(S) : Toshiaki Mabuchi

It is certified that error appears in the above-identified patent and that said Letters Patent is hereby corrected as shown below:

Col. 5, line 25, change "claim 2" to -- claim 3 --.

Signed and Sealed this

Twentieth Day of August, 1996

Attest:

BRUCE LEHMAN

Attesting Officer     Commissioner of Patents and Trademarks